US010877364B2

(12) United States Patent
Akiyama

(10) Patent No.: US 10,877,364 B2
(45) Date of Patent: Dec. 29, 2020

(54) ILLUMINATOR AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/247,846

(22) Filed: Jan. 15, 2019

(65) Prior Publication Data
US 2019/0219912 A1 Jul. 18, 2019

(30) Foreign Application Priority Data
Jan. 16, 2018 (JP) .................................. 2018-004822

(51) Int. Cl.
| | |
|---|---|
| *G03B 21/20* | (2006.01) |
| *G02B 27/10* | (2006.01) |
| *H04N 9/31* | (2006.01) |
| *G02B 27/09* | (2006.01) |
| *G02B 27/28* | (2006.01) |

(52) U.S. Cl.
CPC ....... *G03B 21/208* (2013.01); *G02B 27/0994* (2013.01); *G02B 27/102* (2013.01); *G03B 21/2033* (2013.01); *G03B 21/2066* (2013.01); *H04N 9/3105* (2013.01); *H04N 9/3152* (2013.01); *H04N 9/3161* (2013.01);
(Continued)

(58) Field of Classification Search
CPC .............. G03B 21/208; G03B 21/2033; G03B 21/2066; H04N 9/3164; H04N 9/3105; H04N 9/3167; H04N 9/3152; H04N 9/3161; G02B 27/0994; G02B 27/102; G02B 27/28
See application file for complete search history.

(56) References Cited

U.S. PATENT DOCUMENTS

| | | | | |
|---|---|---|---|---|
| 6,547,400 | B1 * | 4/2003 | Yokoyama | ........... G03B 21/208 353/98 |
| 2004/0067016 | A1 * | 4/2004 | Anikitchev | .......... G02B 6/4206 385/34 |

(Continued)

FOREIGN PATENT DOCUMENTS

| | | |
|---|---|---|
| JP | 2009-520233 A | 5/2009 |
| JP | 2015-64444 A | 4/2015 |

*Primary Examiner* — Michelle M Iacoletti
*Assistant Examiner* — Danell L Owens
(74) *Attorney, Agent, or Firm* — Oliff PLC

(57) ABSTRACT

An illuminator includes a light source apparatus that outputs, in a first direction, light containing first polarized light and second polarized light polarized in directions different from each other, a polarized light combiner that combines the first polarized light and the second polarized light and causes the combined light to exit in the first direction, and a rod integrator that the combined light having exited out of the polarized light combiner enters. The light source apparatus includes a first light emitter group having a configuration in which a plurality of semiconductor lasers including a first semiconductor laser that emits the first polarized light are arranged in a second direction and a second light emitter group having a configuration in which a plurality of semiconductor lasers including a second semiconductor laser that emits the second polarized light are arranged in the second direction.

17 Claims, 5 Drawing Sheets

(52) U.S. Cl.
CPC ......... *H04N 9/3164* (2013.01); *H04N 9/3167* (2013.01); *G02B 27/28* (2013.01)

(56) References Cited

U.S. PATENT DOCUMENTS

| | | | |
|---|---|---|---|
| 2005/0134811 A1* | 6/2005 | Magarill | H04N 9/3105 353/94 |
| 2007/0140616 A1* | 6/2007 | Sugita | G02B 19/0052 385/32 |
| 2008/0018861 A1* | 1/2008 | Schuck | G02B 6/0096 353/20 |
| 2008/0055493 A1* | 3/2008 | Hanano | H05B 45/37 349/9 |
| 2008/0278691 A1 | 11/2008 | Willemsen et al. | |
| 2011/0188003 A1* | 8/2011 | Furutachi | G03B 33/12 353/34 |
| 2016/0223887 A1 | 8/2016 | Egawa et al. | |
| 2017/0331257 A1* | 11/2017 | Eichler | H01L 21/02458 |

\* cited by examiner

ILLUMINATOR AND PROJECTOR

BACKGROUND

1. Technical Field

The present invention relates to an illuminator and a projector.

2. Related Art

In recent years, to enhance the performance of a projector, attention has been directed to a projector using a laser light source, which is a light source having a wide color gamut and is highly efficient.

For example, JP-A-2015-64444 discloses a projector including a light source apparatus for red light including laser light sources for red light, a light source apparatus for green light including laser light sources for green light, a light source apparatus for blue light including laser light sources for blue light, a light diffuser and a light modulator provided on the optical path of each of the color light beams, and a projection system.

JP-T-2009-520233 discloses a projector including a rod integrator for mixing red light, green light, and blue light emitted from laser light sources with one another and homogenizing the intensity of the mixed light.

The projector using the laser light sources disclosed in JP-A-2015-64444 employs a configuration in which a plurality of semiconductor lasers that emit light beams having colors different from one another are so positioned as to be separate from one another and a light combiner combines the light beams emitted from the semiconductor lasers with one another. The configuration described above, however, has a problem of an increase in the overall size of the light source apparatuses.

To solve the problem described above, it is conceivable to employ a configuration in which the plurality of semiconductor lasers that emit light beams having colors different from one another are disposed at the same location and the rod integrator described in JP-T-2009-520233 is used to combine the different color light beams emitted from the plurality of semiconductor lasers. Even when the configuration described above is employed, however, a rod integrator that is long as a whole needs to be used to reduce color unevenness, resulting in a problem of an increase in the overall size of the illuminator.

SUMMARY

An advantage of some aspects of the invention is to provide a compact illuminator. Another advantage of some aspects of the invention is to provide a compact projector including the illuminator described above.

An illuminator according to an aspect of the invention includes a light source apparatus that outputs, in a first direction, light containing first polarized light and second polarized light polarized in directions different from each other, a polarized light combiner that combines the first polarized light and the second polarized light outputted from the light source apparatus with each other and causes the combined light to exit in the first direction, and a rod integrator that the combined light having exited out of the polarized light combiner enters. The light source apparatus includes a first light emitter group having a configuration in which a plurality of semiconductor lasers including a first semiconductor laser that emits the first polarized light are arranged in a second direction that intersects the first direction and a second light emitter group having a configuration in which a plurality of semiconductor lasers including a second semiconductor laser that emits the second polarized light are arranged in the second direction, and the first light emitter group and the second light emitter group are arranged in a third direction that interests the first and second directions.

In the illuminator according to the aspect of the invention, the first polarized light emitted in the first direction from the first light emitter group and the second polarized light emitted in the first direction from the second light emitter group arranged in the third direction with respect to the first light emitter group are combined with each other by the polarized light combiner and enter, as the combined light, the rod integrator. The area of the light incident end surface of the rod integrator can therefore be smaller than in a case where the first polarized light and the second polarized light separately enter the rod integrator, whereby the overall length of the rod integrator can be shortened. A compact illuminator can thus be achieved.

In the illuminator according to the aspect of the invention, a width in the third direction of the combined light may be smaller than a width, in the third direction, of the light outputted from the light source apparatus.

According to the configuration described above, the dimension of the light incident end surface of the rod integrator in the third direction (direction in which first light emitter group and second light emitter group are arranged) can be reduced, whereby the overall length of the rod integrator can be shortened.

The illuminator according to the aspect of the invention may further include a collimator lens that is provided between the light source apparatus and the polarized light combiner and parallelizes, in the third direction, the light outputted from the light source apparatus.

According to the configuration described above, since the light parallelized by the collimator lens enters the polarized light combiner, the polarized light combiner can combine the first polarized light and the second polarized light with each other with increased efficiency, whereby a sufficient amount of combined light can be ensured.

In the illuminator according to the aspect of the invention, the collimator lens may be a cylindrical collimator lens having a generatrix extending in the second direction, and the rod integrator may be a tapered rod integrator tapered in the second direction.

In the illuminator according to the aspect of the invention, a cylindrical collimator lens having a generatrix extending in the second direction can be used to parallelize in the third direction the light outputted from the light source apparatus. However, the cylindrical collimator lens has no power in the second direction and cannot therefore increase in the second direction the angle of incidence of the light incident on the light incident end surface of the rod integrator. In this case, using a tapered rod integrator tapered in the second direction allows an increase in the number of reflection actions of the light in the tapered rod integrator. The uniformity of the optical intensity of the light can therefore be increased with no increase in the overall length of the rod integrator.

The illuminator according to the aspect of the invention may further include an angle conversion lens that is provided between the polarized light combiner and the rod integrator and non-parallelizes in the third direction the combined light having exited out of the polarized light combiner.

As described above, the configuration in which the light parallelized in the third direction enters the polarized light combiner is preferable from the viewpoint of light combination efficiency. In contrast, when the light having exited out of the polarized light combiner enters as parallelized light the rod integrator, no internal reflection of the light occurs in the rod integrator, so that the optical intensity of the light cannot be homogenized in the third direction. In this case, providing the illuminator with the angle conversion lens that non-parallelizes in the third direction the combined light having exited out of the polarized light combiner allows internal reflection of the light in the rod integrator, whereby the optical intensity of the light can be homogenized also in the third direction.

In the illuminator according to the aspect of the invention, the angle conversion lens may be formed of a cylindrical concave lens.

According to the configuration described above, the light having exited out of the angle conversion lens is not focused, unlike in a case where a cylindrical convex lens is used as the angle conversion lens. Heat generation in the light focused position, disturbance of the polarization state, and other problems are therefore unlikely to occur. As a result, the reliability of the illuminator is improved, and the illuminator is suitable for a projector using a liquid crystal light valve as a light modulator.

In the illuminator according to the aspect of the invention, the plurality of semiconductor lasers may include a plurality of red semiconductor lasers, a plurality of green semiconductor lasers, and at least one blue semiconductor laser. The plurality of red semiconductor lasers may form the first light emitter group, and the plurality of green semiconductor lasers and the at least one blue semiconductor laser may form the second light emitter group.

According to the configuration described above, white light can be produced. Further, the blue semiconductor laser, and the green semiconductor lasers, and the red semiconductor lasers emit light beams linearly polarized in directions different from one another. Therefore, when the plurality of red semiconductor lasers form the first light emitter group and the plurality of green semiconductor lasers and the plurality of blue semiconductor lasers form the second light emitter group, an efficient illuminator can be achieved.

A projector according to another aspect of the invention includes the illuminator according to the aspect of the invention, a light modulator that modulates light from the illuminator in accordance with image information to produce image light, and a projection optical apparatus that projects the image light.

According to the configuration described above, a compact projector can be achieved.

In the projector according to the aspect of the invention, the third direction may coincide with a widthwise direction of a light modulation region of the light modulator, and the second direction may coincide with a lengthwise direction of the light modulation region.

The configuration described above allows the arrangement of the semiconductor lasers, which form the light source apparatus, to readily match with the shape of the light modulation region of the light modulator, whereby an efficient projector can be achieved.

In the projector according to the aspect of the invention, a shape of a light exiting end surface of the rod integrator may be roughly similar to a shape of the light modulation region.

According to the configuration described above, the projector can be configured with no use of a shaping optical system or any other optical system located between the rod integrator and the light modulator.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below with reference to FIGS. 1 to 6.

Figure 1:
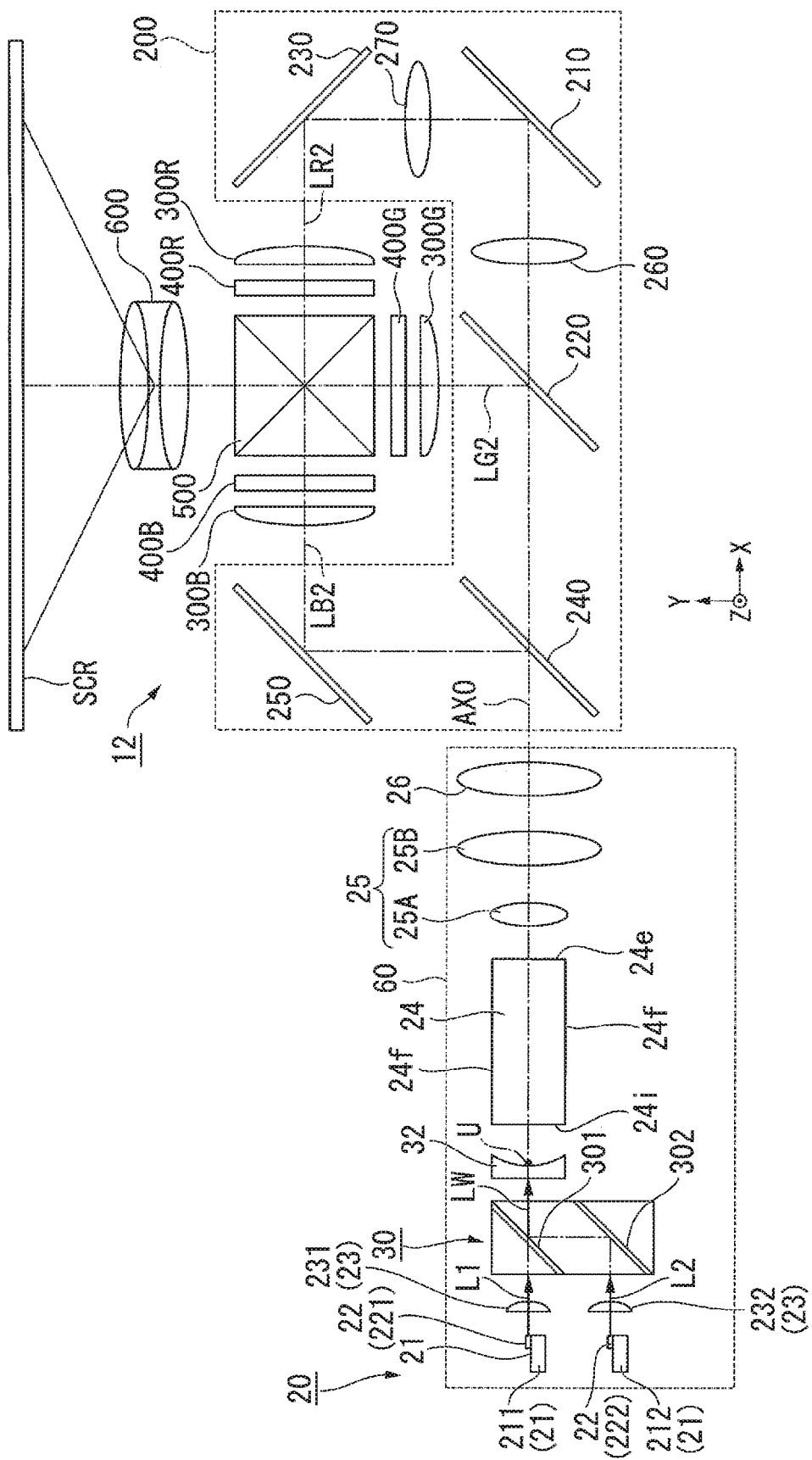
FIG. 1 is a schematic configuration diagram of a projector according to an embodiment of the invention.

FIG. 1 is a schematic configuration diagram of a projector according to the present embodiment.

In the following drawings, each component is drawn at a different dimensional scale depending on the component in some cases for clarity of the component.

In FIG. 1, the direction in which an illuminator outputs light is an X-axis direction, the direction in which a projection optical apparatus outputs light is a Y-axis direction, and the direction perpendicular to the X-axis direction and the Y-axis direction is a Z-axis direction. The coordinate axes in the other figures are shown in correspondence with the coordinate axes in FIG. 1.

A projector 12 according to the present embodiment includes an illuminator 60, a color separation/guide system 200, a light modulator for red light 400R, a light modulator for green light 400G, a light modulator for blue light 400B, a light combining system 500, and a projection optical apparatus 600, as shown in FIG. 1.

The illuminator 60 according to the present embodiment includes a light source apparatus 20 including a blue semiconductor laser, a green semiconductor laser, and a red semiconductor laser. The illuminator 60 outputs white combined light LW, which is the combination of the blue light, the green light, and the red light emitted from the color semiconductor lasers.

The configuration of the illuminator 60 will be described later in detail.

The color separation/guide system 200 includes a dichroic mirror 240, a dichroic mirror 220, a reflection mirror 210, reflection mirror 230, reflection mirror 250, a relay lens 260, and a relay lens 270. The color separation/light guide system 200 separates the white combined light LW outputted from the illuminator 60 into red light LR2, green light LG2, and blue light LB2 and guides the red light LR2, the green light LG2, and the blue light LB2 to the corresponding light modulator for red light 400R, light modulator for green light 400G, and light modulator for blue light 400B, respectively.

The dichroic mirror 240 reflects the blue light LB2 and transmits the red light LR2 and the green light LG2. The dichroic mirror 220 reflects the green light LG2 and transmits the red light LR2. The reflection mirrors 210 and 230 reflect the red light LR2. The reflection mirror 250 reflects the blue light LB2. The relay lenses 260 and 270 are provided on the optical path of the red light LR2.

A field lens 300R is disposed between the color separation/light guide system 200 and the light modulator for red light 400R. A field lens 300G is disposed between the color separation/light guide system 200 and the light modulator for green light 400G. A field lens 300B is disposed between the color separation/light guide system 200 and the light modulator for blue light 400B.

The light modulator for red light 400R, the light modulator for green light 400G, and the light modulator for blue light 400B are each formed of a liquid crystal panel that modulates the color light incident thereon in accordance with image information to produce image light.

Although not shown, a light-incident-side polarizer is disposed between the light modulator for red light 400R and the field lens 300R. The same holds true for the light modulator for green light 400G and the light modulator for blue light 400B. A light-exiting-side polarizer is disposed between the light modulator for red light 400R and the light combining system 500. The same holds true for the light modulator for green light 400G and the light modulator for blue light 400B.

The light combining system 500 combines the color image light fluxes outputted from the light modulator for red light 400R, the light modulator for green light 400G, and the light modulator for blue light 400B with one another. The light combining system 500 is formed of a cross dichroic prism formed by bonding four rectangular prisms to each other and therefore having a roughly square shape in a plan view. Dielectric multilayer films are provided along the roughly X-letter-shaped interfaces between the bonded rectangular prisms.

The image light having exited out of the light combining system 500 is enlarged and projected by the optical projection apparatus 600 on a screen SCR. The projection optical apparatus 600 is formed of a plurality of projection lenses.

The configuration of the illuminator 60 will be described below.

Figure 2:
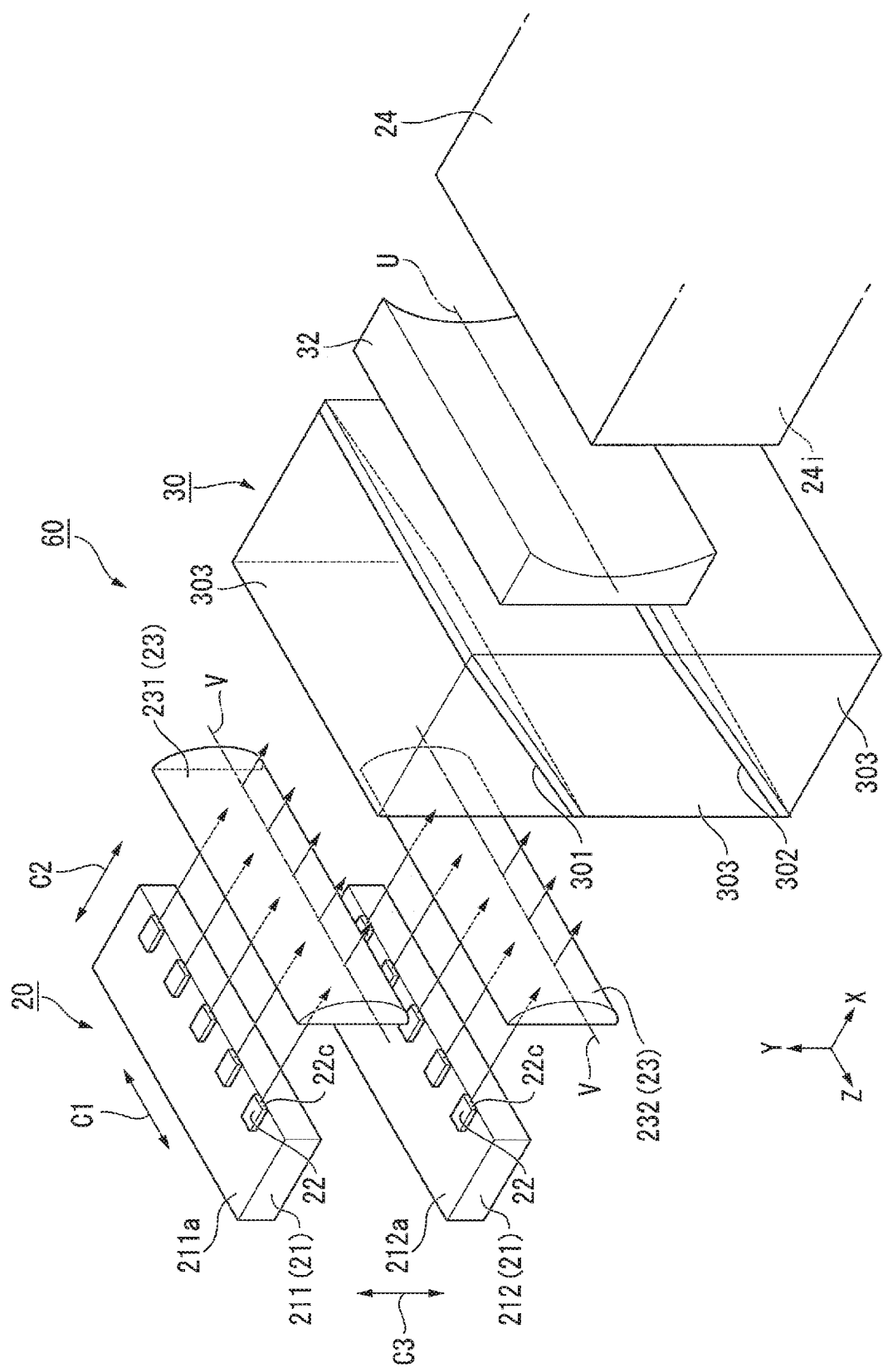
FIG. 2 is a perspective view of key parts of an illuminator.
Figure 3:
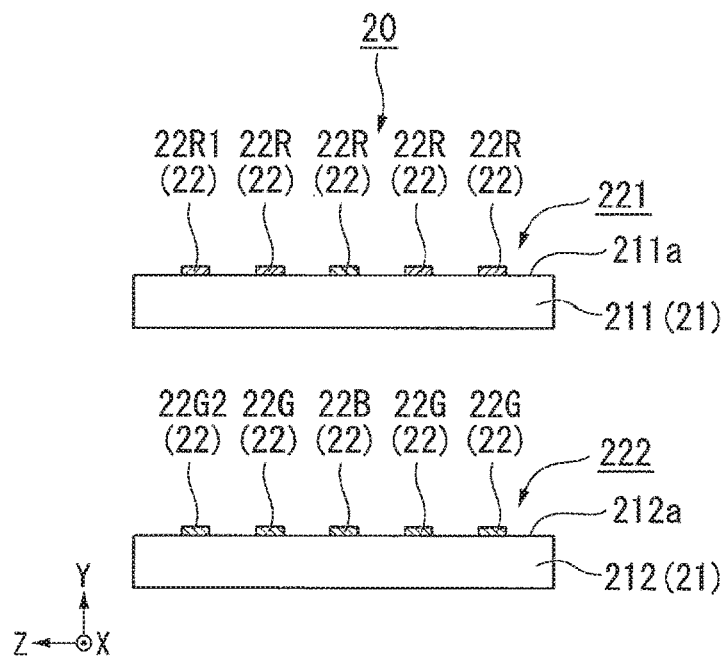
FIG. 3 is a front view of a light source apparatus.

FIG. 2 is a perspective view of key parts of the illuminator 60. FIG. 3 is a front view of the light source apparatus 20 provided in the illuminator 60.

The illuminator 60 includes the light source apparatus 20, a plurality of collimator lenses 23, a polarized light combiner 30, an angle conversion lens 32, a rod integrator 24, a pickup system 25, and a light collection system 26 as shown in FIG. 1.

The light source apparatus 20 includes a plurality of substrates 21 and a plurality of semiconductor lasers 22, as shown in FIGS. 2 and 3.

The plurality of substrates 21 are formed of a first substrate 211 and a second substrate 212. The first substrate 211 and the second substrate 212 are provided with the plurality of semiconductor lasers 22. The plurality of semiconductor lasers 22 are arranged at intervals in a lengthwise direction C1 (second direction) on a mounting surface 211a of the first substrate 211 and a mounting surface 212a of the second substrate 212. The first substrate 211 and the second substrate 212 are arranged in a direction C3 (third direction) perpendicular to the lengthwise direction C1 and a widthwise direction C2. The lengthwise direction C1 is the lengthwise direction of the mounting surface 211a of the first substrate 211 or the mounting surface 212a of the second substrate 212. The widthwise direction C2 is the widthwise direction of the mounting surface 211a of the first substrate 211 or the mounting surface 212a of the second substrate 212.

The first substrate 211 and the second substrate 212 are each provided with five semiconductor lasers 22, as shown in FIG. 3. The five semiconductor lasers 22 on the first substrate 211 are each formed of a red semiconductor laser 22R. The five semiconductor lasers 22 on the second substrate 212 include one blue semiconductor laser 22B and four green semiconductor lasers 22G. The one blue semiconductor laser 22B is the central one of the five semiconductor lasers 22. The four green semiconductor lasers 22G are so disposed that two green semiconductor lasers 22G are disposed on opposite sides of the blue semiconductor laser 22B. The numbers of color semiconductor lasers 22 are not limited to those in the example described above and can be changed as appropriate. For example, the number of semiconductor lasers 22 provided on the first substrate 211 may differ from the number of semiconductor lasers 22 provided on the second substrate 212.

Figure 4:
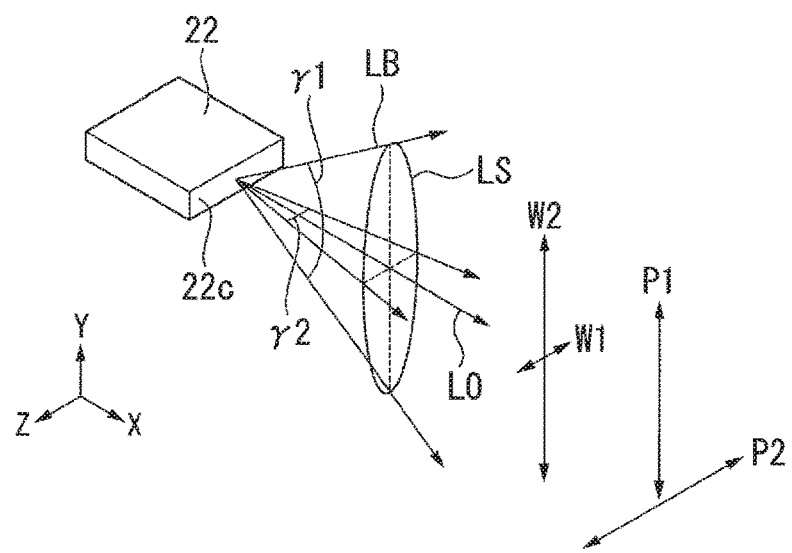
FIG. 4 is a perspective view of a semiconductor laser.

FIG. 4 is a perspective view of one of the semiconductor lasers 22.

The blue semiconductor laser 22B, the green semiconductor lasers 22G, and the red semiconductor lasers 22R have the same configuration and will therefore be collectively called semiconductor lasers 22 in the following description.

The semiconductor lasers 22 each have a light emission region 22c, from which light is emitted, as shown in FIG. 4. The light emission region 22c has an oblong plan shape having a lengthwise direction W1 and a widthwise direction W2 when viewed along a chief ray L0 of emitted light LB. The ratio of the dimension of the light emission region 22c in the lengthwise direction W1 to the dimension of the light emission region 22c in the widthwise direction W2 (W1/W2) is preferably 30/1 or greater. In the present embodiment, the dimension of the light emission region 22c in the lengthwise direction W1 is, for example, 40 μm, and the dimension of the light emission region 22c in the widthwise direction W2 is, for example, 1 μm. The shape and dimensions of the light emission region 22c are not limited to those described above.

The semiconductor lasers 22 each emit the light LB having an elliptical cross section LS in the X-axis direction (first direction). The minor axis of the elliptical shape extends in the lengthwise direction W1 of the light emission region 22c, and the major axis of the elliptical shape extends in the widthwise direction W2 of the light emission region 22c. That is, the light LB emitted from each of the semiconductor lasers 22 has a divergence angle γ1 in a plane perpendicular to the lengthwise direction W1 of the light emission region 22c (XY plane) and a divergence angle γ2 in a plane perpendicular to the widthwise direction W2 of the light emission region 22c (XZ plane) with the divergence angle γ1 greater than the divergence angle γ2. The divergence angle γ1 of the light LB is, for example, 70° at the maximum (maximum radiation angle), and the divergence angle γ2 of the light LB is, for example, 20° at the maximum (maximum radiation angle). The plurality of semiconductor lasers 22 are each so disposed that the lengthwise direction W1 of the light emission region 22c coincides with the lengthwise direction C1 of the substrates 21.

The color semiconductor lasers 22 have the same configuration, as described above. In a currently commercially available semiconductor laser, a red semiconductor laser, a blue semiconductor laser, and a green semiconductor laser operate in different oscillation modes and therefore emit light beams linearly polarized in directions different from one another. The red semiconductor lasers 22R each emit linearly polarized light having a polarization direction P1, which coincides with the widthwise direction W2 of the light emission region 22c. The linearly polarized light having the polarization direction P1 is P-polarized light with respect to a polarization separation film 301 of the polarized light combiner 30, which will be described later. On the other hand, the blue semiconductor lasers 22B and the green semiconductor lasers 22G each emit linearly polarized light having a polarization direction P2, which coincides with the lengthwise direction W1 of the light emission region 22c. The linearly polarized light having the polarization direction P2 is S-polarized light with respect to the polarization separation film 301 of the polarized light combiner 30, which will be described later.

In the present embodiment, the plurality of red semiconductor lasers 22R on the first substrate 211 are referred to as a first light emitter group 221, and out of the plurality of red semiconductor lasers 22R, an arbitrary one red semiconductor laser 22R, for example, the left-end red semiconductor laser 22R in FIG. 3 is referred to as a first semiconductor laser 22R1. The plurality of green semiconductor lasers 22G and one blue semiconductor laser 22B on the second substrate 212 are referred to as a second light emitter group 222, and out of the plurality of green semiconductor lasers 22G and the blue semiconductor laser 22B, an arbitrary one semiconductor laser 22, for example, the left-end green semiconductor laser 22G in FIG. 3 is referred to as a second semiconductor laser 22G2.

The first light emitter group 221 has a configuration in which the plurality of semiconductor lasers 22 that include the first semiconductor laser 22R1 and emit P-polarized light (first polarized light) with respect to the polarization separation film 301 are arranged in the direction Z (second direction). The second light emitter group 222 has a configuration in which the plurality of semiconductor lasers 22 that include the second semiconductor laser 22G2 and emit S-polarized (second polarized light) light with respect to the polarization separation film 301 are arranged in the direction Z (second direction). The first light emitter group 221 and the second light emitter group 222 are arranged in the Y-axis direction (third direction). The light source apparatus 20 as a whole outputs light containing the P-polarized light and the S-polarized light, which are polarized in the directions different from each other, in the X-axis direction.

The plurality of collimator lenses 23 are provided between the light source apparatus 20 and the polarized light combiner 30, as shown in FIGS. 1 and 2. The plurality of collimator lenses 23 parallelize the light outputted from the light source apparatus 20 in the Y-axis direction (third direction).

The plurality of collimator lenses 23 are formed of a first collimator lens 231 and a second collimator lens 232. The first collimator lens 231 and the second collimator lens 232 are each formed of a cylindrical collimator lens having a generatrix V extending in the Z-axis direction (second direction). The first collimator lens 231 and the second collimator lens 232 are so disposed that the direction of the generatrix V of each of the collimator lenses 23 is parallel to the lengthwise direction C1 of the light emission region 22c of each of the semiconductor lasers 22. The first collimator lens 231 is so disposed as to face the light emission region 22c of each of the plurality of semiconductor lasers 22 on the first substrate 211. The second collimator lens 22 is so disposed as to face the light emission region 22c of each of the plurality of semiconductor lasers 22 on the second substrate 212.

The polarized light combiner 30 is so provided as to cover the light exiting side of the first collimator lens 231 and the light exiting side of the second collimator lens 232. The polarized light combiner 30 is formed of the polarization separation film 301, a reflection film 302, and a plurality of transparent members 303.

The polarization separation film 301 is so provided on the optical path of the light beams emitted from the plurality of semiconductor lasers 22 that belong to the first light emitter group 221 as to incline with respect to the optical path by 45°, as shown in FIG. 1. The reflection film 302 is so provided on the optical path of the light beams emitted from the plurality of semiconductor lasers 22 that belong to the second light emitter group 222 as to incline with respect to the optical path by 45°. The light beam emitted from each of the plurality of semiconductor lasers 22 that belong to the first light emitter group 221 is hereinafter referred to as first light L1, and the light beam emitted from each of the plurality of semiconductor lasers 22 that belong to the second light emitter group 222 is hereinafter referred to as second light L2.

The polarized light combiner 30 is configured as an optical element formed of the polarization separation film 301, the reflection film 302, and the plurality of transparent members 303 integrated with each other with the polarization separation film 301 sandwiched between two of the plurality of transparent members 303 and the reflection film 302 sandwiched between two of the plurality of transparent members 303. It is, however, noted that the polarization separation film 301 and the reflection film 302 may be each individually supported by a transparent plate. The polarized light combiner 30, a detailed effect provided by which will be described later, combines light beams outputted from the light source apparatus 20 and polarized in directions different from one another with one another into the white combined light LW and outputs the white combined light LW in the X-axis direction.

The angle conversion lens 32 is provided on the optical path of the first light L1 between the polarized light combiner 30 and the rod integrator 24. The angle conversion lens 32 non-parallelizes, in the Y-axis direction (in XY plane), the combined light LW having exited out of the polarized light combiner 30. The angle conversion lens 32 is formed of a cylindrical concave lens having a generatrix U extending in the Z-axis direction (second direction).

The rod integrator 24 is provided on the optical path of the combined light LW between the angle conversion lens 32 and the pickup system 25. The rod integrator 24 is formed of a quadrangular columnar light transmissive member. The rod integrator 24 has a light incident end surface 24i, on which the combined light LW is incident, a light exiting end surface 24e, which faces away from the light incident end surface 24i, and four reflection surfaces 24f. The rod integrator 24 is formed of a tapered rod integrator tapered in the Z-axis direction (in XZ plane) (see FIG. 6).

The combined light LW is reflected multiple times off the reflection surfaces 24f while passing through the rod integrator 24, whereby the intensity distribution of the combined light LW is homogenized. The rod integrator 24 is formed of a solid light transmissive member and may instead be formed of a hollow tubular member having inner surfaces that serve as the reflection surfaces.

The pickup system 25 is formed of a first convex lens 25A and a second convex lens 25B. The pickup system 25 roughly parallelizes the combined light LW having exited out of the rod integrator 24.

The light collection system. 26 is formed of a convex lens. The light collection system 26 collects the combined light LW having exited out of the pickup system 25 and directs the collected combined light LW toward the light modulators 400B, 400G, and 400R.

The effect of the illuminator 60 will be described below.

Figure 5:
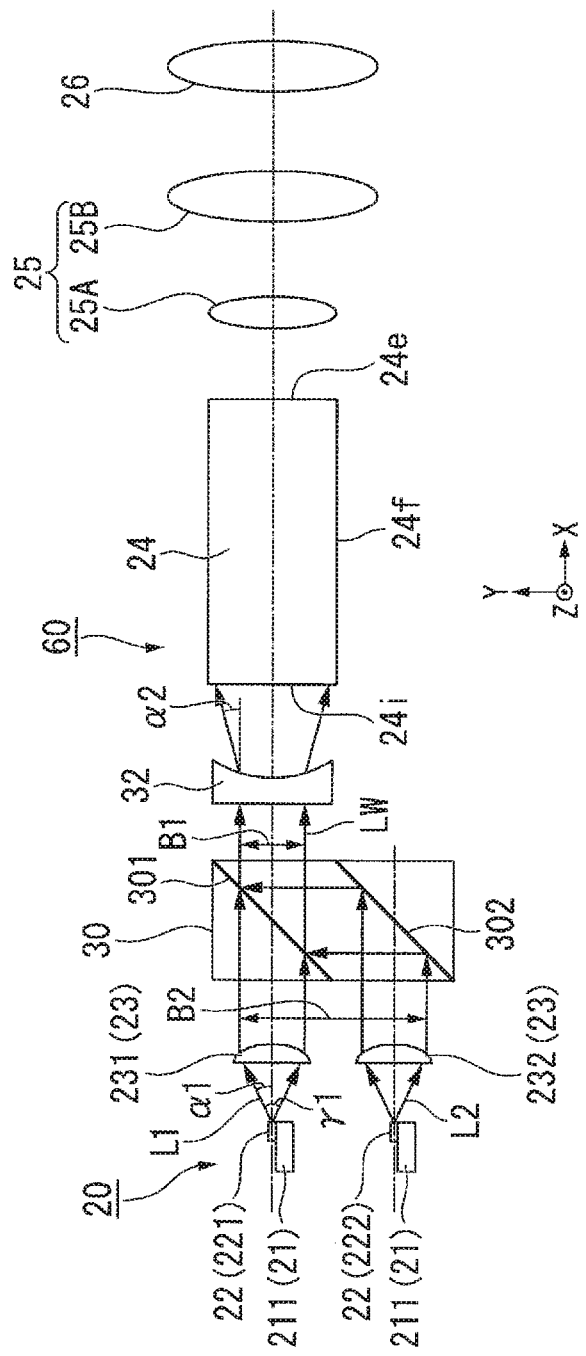
FIG. 5 describes an effect of the illuminator viewed in a Z-axis direction.
Figure 6:
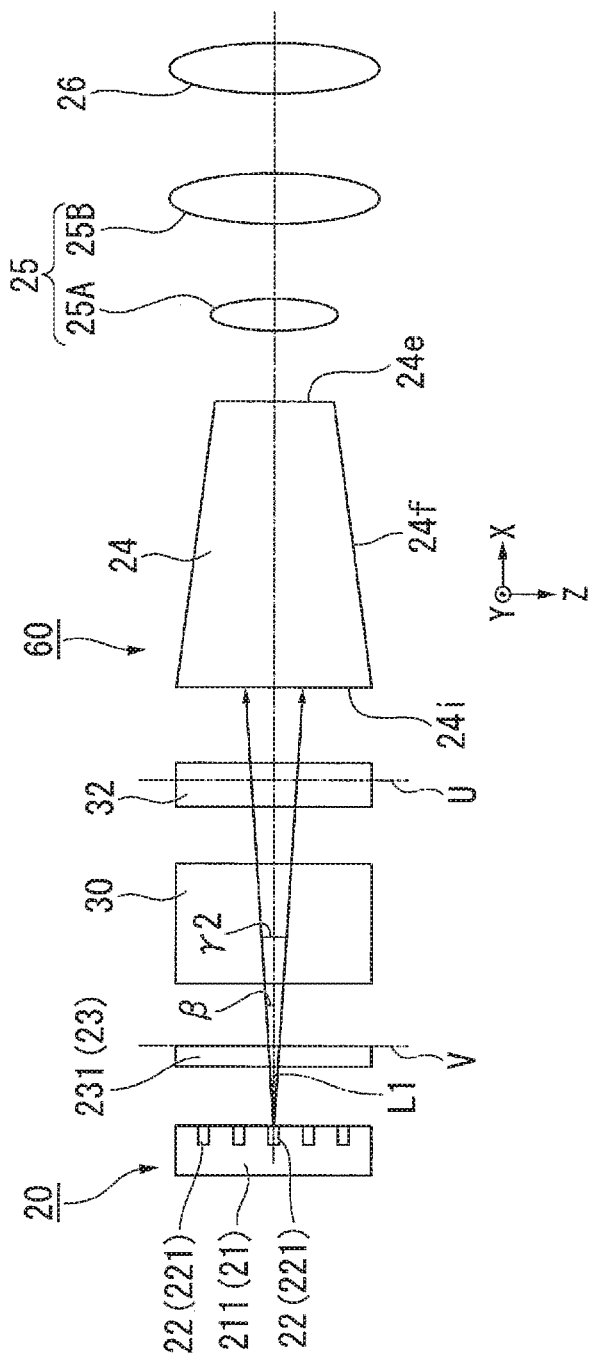
FIG. 6 describes the effect of the illuminator viewed in a Y-axis direction.

FIG. 5 shows the behavior of the light in the illuminator 60 viewed in the Z-axis direction. FIG. 6 shows the behavior of the light in the illuminator 60 viewed in the Y-axis direction.

When the illuminator 60 is viewed in the Z-axis direction, the plurality of semiconductor lasers 22 that belong to the first light emitter group 221 each emit light having the divergence angle γ1, as shown in FIG. 5. Let α1 be the angle between the light ray emitted at the divergence angle γ1 and the optical axis of the semiconductor laser 22, and α1=γ1/2. The first light L1 emitted from each of the corresponding semiconductor lasers 22 is parallelized by the first collimator lens 231 and then enters the polarized light combiner 30. The first light L1, which is P-polarized light with respect to the polarization separation film 301 as described above, passes through the polarization separation film 301 and exits out of the polarized light combiner 30.

On the other hand, the second light L2 emitted from each of the plurality of semiconductor lasers 22 that belong to the second light emitter group 222 is parallelized by the second collimator lens 232 and then enters the polarized light combiner 30. The second light L2 is so reflected off the reflection film 302 that the optical path of the second light L2 is deflected by 90°, and the reflected second light L2 is incident on the polarization separation film 301. The second light L2, which is S-polarized light with respect to the polarization separation film 301 as described above, is so reflected off the polarization separation film 301 that the optical path of the second light L2 is deflected by 90°, and the reflected second light L2 exits along with the first light L1 out of the polarized light combiner 30.

That is, the first light L1 emitted from each of the red semiconductor lasers 22R and the second light L2 emitted from each of the green semiconductor lasers 22G and the blue semiconductor laser 22B are combined with each other by the polarized light combiner 30 into the combined light LW, which exits out the polarized light combiner 30 toward the angle conversion lens 32.

While the first light L1 and the second light L2 pass through the polarized light combiner 30, the angle of the light is not converted, and the combined light LW having exited out of the polarized light combiner 30 is therefore parallelized light. The combined light LW is non-parallelized by the angle conversion lens 32 into light having a predetermined divergence angle, which enters the rod integrator 24. Let α2 be the angle between the light ray having exited out of the angle conversion lens 32 at the greatest divergence angle and the center axis of the combined light LW, and the angle α2 may be smaller than the angle α1. That is, the following conditions may be satisfied: α2≠0; and α2<α1.

As described above, the combined light LW having exited out of the polarized light combiner 30 is non-parallelized by the angle conversion lens 32, is therefore reflected off the reflection surfaces 24f of the rod integrator 24. The intensity distribution of the combined light LW is therefore homogenized, and the resultant combined light LW exits via the light exiting end surface 24e of the rod integrator 24.

In contrast, when the illuminator 60 is viewed in the Y-axis direction, the first light L1 and the second light L2 identically behave, as shown in FIG. 6. The effect provided by the illuminator 60 will therefore be described below with reference to the first light L1 as representative light.

The first collimator lens 231, which is so disposed that the generatrix V is oriented in the direction parallel to the Z-axis direction, has no power in an XZ plane. The polarized light combiner 30 provides no effect of causing light to converge or diverge. The angle conversion lens 32, which is so disposed that the generatrix U is oriented in the direction parallel to the Z-axis direction, has no power in an XZ plane, as does the first collimator lens 231.

Therefore, the first light L1, when viewed in the Y-axis direction, enters the rod integrator 24 with the divergence angle γ2, at which the first light L1 is emitted from each of the semiconductor lasers 22, maintained. Let β be the angle between the light ray emitted at the divergence angle γ2 and the optical axis of the semiconductor laser 22, and β=γ2/2.

Since the divergence angle γ2 is, for example, about 20°, as described above, the angle β is about 10°, and the first light L1 enters the rod integrator 24 at an angle of incidence smaller than that in an XY plane. Therefore, when a non-tapered rod integrator is used, the number of reflection actions of the light in the rod integrator decreases, and the intensity of the light could not be sufficiently homogenized.

In contrast, in the present embodiment, in which a tapered rod integrator tapered in the Z-axis direction (in XZ plane) is used as the rod integrator 24, the number of reflection actions of the light in the rod integrator 24 can be increased as compared with the case where a non-tapered rod integrator is used, whereby the intensity of the light can be sufficiently homogenized.

Consider now an illuminator according to Comparative Example including no polarized light combiner.

In the illuminator according to Comparative Example, the light outputted from the first light emitter group and the light outputted from the second light emitter group are not combined with each other but separately enter the rod integrator. In this case, the light incident end surface of the rod integrator needs to be so sized that both the first light and the second light are allowed to be incident on the light incident end surface. Therefore, to ensure a sufficient number of reflection actions of the light in the rod integrator, the overall length of the rod integrator needs to be increased.

Further, in the illuminator according to Comparative Example, in which the first light and the second light are each incident in a position shifted from the optical axis of the rod integrator in the Y-axis direction, the first light and the second light could undesirably exit out of the rod integrator in some cases with the first light and the second light separate from each other in the Y-axis direction. Also for the purpose of sufficiently mixing the first light and the second light with each other in this case, the overall length of the rod integrator needs to be increased. As a result, the size of the illuminator undesirably increases.

To solve the problem, in the present embodiment, the illuminator 60 includes the polarized light combiner 30. A Y-axis-direction width B1 of the combined light LW having exited out of the polarized light combiner 30 is smaller than a Y-axis-direction width B2 of the light outputted from the light source apparatus 20 (combination of first light L1 and the second light L2), as shown in FIG. 5. Therefore, in the present embodiment, the Y-axis-direction width of the light incident end surface 24i of the rod integrator 24 can, for example, be roughly halved, as compared with the rod integrator in Comparative Example.

Further, since the center axis of the combined light LW that enters the rod integrator 24 coincides with the optical axis of the rod integrator 24, the color light beams that form the combined light LW are sufficiently mixed with one another in the rod integrator 24. According to the present embodiment, the effects described above allow the optical intensity of the combined light LW can be homogenized with no increase in the overall length of the rod integrator 24. A compact illuminator 60 can thus be achieved.

The projector 12 according to the present embodiment, which includes the illuminator 60 described above, can be reduced in terms of size.

Further, in the illuminator 60 according to the present embodiment, which includes the collimator lenses 23, which parallelize the light fluxes outputted from the light source apparatus 20, the light fluxes parallelized by the collimator lenses 23 enter the polarized light combiner 30. The polarized light combiner 30 can therefore combine the light fluxes with each other with increased efficiency, whereby a sufficient amount of combined light LW can be ensured.

In the illuminator 60 according to the present embodiment, which includes the angle conversion lens 32, which non-parallelizes in the Y-axis direction the combined light LW having exited out of the polarized light combiner 30, the combined light LW is reflected in the rod integrator 24 in the Y-axis direction, whereby the optical intensity of the combined light LW can be homogenized also in the Y-axis direction.

Further, since the angle conversion lens 32 is formed of a cylindrical concave lens, the light having exited out of the angle conversion lens 32 is not focused. Heat generation in the light focused position, disturbance of the polarization state, and other problems are therefore unlikely to occur. As a result, the reliability of the illuminator 60 is improved, and the illuminator 60 is suitable for a projector using liquid crystal light valves as the light modulators. Further, adjusting the power of the cylindrical concave lens allows adjustment of the angle of incidence of the light incident on the rod integrator 24.

In the illuminator 60 according to the present embodiment, the light source apparatus 20, which includes the plurality of red semiconductor lasers 22R, the plurality of green semiconductor lasers 22G, and the plurality of blue semiconductor lasers 22B, can produce white light. Further, since the plurality of red semiconductor lasers 22R form the first light emitter group 221, and the plurality of green semiconductor lasers 22G and one blue semiconductor laser 22B form the second light emitter group 222, an efficient illuminator 60 can be achieved.

For example, in a typical semiconductor laser, the amount of necessary cooling varies on an emitted light color basis. Therefore, if the first substrate 211 and the second substrate 212 are each provided with three types of color semiconductor lasers, it is difficult to appropriately cool each of the substrates. In contrast, the illuminator 60 according to the present embodiment allows appropriate cooling of each of the substrates 21.

In the present embodiment, since the first substrate 211 and the second substrate 212, on each of which a plurality of semiconductor lasers 22 are arranged, are arranged in the direction perpendicular to the direction in which the semiconductor lasers 22 are arranged, the plurality of semiconductor lasers 22 can be two-dimensionally arranged in a plane perpendicular to the center axis of the light formed of the emitted light beams. A greater number of semiconductor lasers 22 can therefore be disposed in a limited space.

In the present embodiment, the plurality of semiconductor lasers 22 are each so disposed that the lengthwise direction W1 of the light emission region 22c coincides with the lengthwise direction C1 of the substrates 21 (direction in which plurality of semiconductor lasers are arranged). Therefore, even in the case where the first substrate 211 and the second substrate 212 are each provided with five semiconductor lasers 22, the number of collimator lenses 23 only needs to be equal to the number of substrates 21, that is, two collimator lenses 23 suffice. The number of incorporated collimator lenses 23 can thus be minimized, whereby the configuration of the illuminator 60 can be simplified.

In the projector 12 according to the present embodiment, the Y-axis direction coincides with the widthwise direction of the light modulation region of each of the light modulators 400B, 400G, and 400R, and the Z-axis direction coincides with the lengthwise direction of the light modulation region. The configuration described above allows the arrangement of the semiconductor lasers 22 that form the light source apparatus 20 to readily match with the shape of the light modulation region of each of the light modulators 400B, 400G, and 400R, whereby an efficient projector can be achieved.

In the projector 12 according to the present embodiment, the shape of the light exiting end surface 24e of the rod integrator 24 is roughly similar to the shape of the light modulation regions. The projector can therefore be configured with no use of a shaping optical system or any other optical system located between the rod integrator 24 and the light modulators 400B, 400G, 400R.

The technical range of the invention is not limited to the embodiment described above, and a variety of changes can be made thereto to the extent that the changes do not depart from the substance of the invention.

For example, in the embodiment described above, the plurality of red semiconductor lasers form the first light emitter group, and the plurality of green semiconductor lasers and blue semiconductor lasers form the second light emitter group. Conversely, the plurality of green semiconductor lasers and blue semiconductor lasers form may form the first light emitter group, and the plurality of red semiconductor lasers may form the second light emitter group.

That is, the light source apparatus may be so configured that the vertical positional relationship between the first substrate and the second substrate in the embodiment described above is reversed. In this case, one of the following configurations may be employed: a configuration in which the positions of the polarized light combiner and other optical parts are vertically reversed, as in the light source apparatus; and a configuration in which a half-wave plate is added in a position between the light source apparatus and the polarized light combiner to allow the same positions of the polarized light combiner and other optical parts in the embodiment described above.

The number, the arrangement, the shape, the material, the dimension, and other factors of the components of the light source apparatus, the illuminator, and the projector presented in the embodiment described above can be changed as appropriate.

In the embodiment described above, the case where the illuminator according to the embodiment of the invention is used in a projector is presented by way of example, but not necessarily. The illuminator according to the embodiment of the invention may be used as a headlight of an automobile or any other lighting apparatus.

The entire disclosure of Japanese Patent Application No. 2018-004822, filed on Jan. 16, 2018 is expressly incorporated by reference herein.

What is claimed is:

1. An illuminator comprising:
a light source apparatus that outputs, in a first direction, light containing first polarized light and second polarized light polarized in directions different from each other;
a polarized light combiner that combines the first polarized light and the second polarized light outputted from the light source apparatus with each other and causes the combined light to exit in the first direction; and
a rod integrator that the combined light having exited out of the polarized light combiner enters,
wherein the light source apparatus includes a first light emitter group having a configuration in which a plurality of semiconductor lasers including a first semiconductor laser that emits the first polarized light are arranged in a second direction that intersects the first direction and a second light emitter group having a configuration in which a plurality of semiconductor lasers including a second semiconductor laser that emits the second polarized light are arranged in the second direction,
the first light emitter group and the second light emitter group are arranged in a third direction that interests the first and second directions, and
the plurality of semiconductor lasers in the first light emitter group emit lights of the same polarization, and the plurality of semiconductor lasers in the second light emitter group emit lights also of a same polarization different from the polarization of the plurality of semiconductor lasers in the first light emitter group.

2. The illuminator according to claim 1, wherein a width, in the third direction, of the combined light is smaller than a width, in the third direction, of the light outputted from the light source apparatus.

3. The illuminator according to claim 1, further comprising a collimator lens that is provided between the light source apparatus and the polarized light combiner and parallelizes, in the third direction, the light outputted from the light source apparatus.

4. The illuminator according to claim 3,
wherein the collimator lens is a cylindrical collimator lens having a generatrix extending in the second direction, and
the rod integrator is a tapered rod integrator tapered in the second direction.

5. The illuminator according to claim 3, further comprising an angle conversion lens that is provided between the polarized light combiner and the rod integrator and nonparallelizes in the third direction the combined light having exited out of the polarized light combiner.

6. The illuminator according to claim 5, wherein the angle conversion lens is formed of a cylindrical concave lens.

7. The illuminator according to claim 1,
wherein the plurality of semiconductor lasers include a plurality of red semiconductor lasers, a plurality of green semiconductor lasers, and at least one blue semiconductor laser,
the plurality of red semiconductor lasers form the first light emitter group, and
the plurality of green semiconductor lasers and the at least one blue semiconductor laser form the second light emitter group.

8. A projector comprising:
the illuminator according to claim 1;
a light modulator that modulates light from the illuminator in accordance with image information to produce image light; and
a projection optical apparatus that projects the image light.

9. A projector comprising:
the illuminator according to claim 2;
a light modulator that modulates light from the illuminator in accordance with image information to produce image light; and
a projection optical apparatus that projects the image light.

10. A projector comprising:
the illuminator according to claim 3;
a light modulator that modulates light from the illuminator in accordance with image information to produce image light; and
a projection optical apparatus that projects the image light.

11. A projector comprising:
the illuminator according to claim 4;
a light modulator that modulates light from the illuminator in accordance with image information to produce image light; and
a projection optical apparatus that projects the image light.

12. A projector comprising:
the illuminator according to claim 5;
a light modulator that modulates light from the illuminator in accordance with image information to produce image light; and
a projection optical apparatus that projects the image light.

13. A projector comprising:
the illuminator according to claim 6;
a light modulator that modulates light from the illuminator in accordance with image information to produce image light; and
a projection optical apparatus that projects the image light.

14. A projector comprising:
the illuminator according to claim 7;
a light modulator that modulates light from the illuminator in accordance with image information to produce image light; and
a projection optical apparatus that projects the image light.

15. The projector according to claim 8, wherein the third direction coincides with a widthwise direction of a light modulation region of the light modulator, and the second direction coincides with a lengthwise direction of the light modulation region.

16. The projector according to claim 15, wherein a shape of a light exiting end surface of the rod integrator is roughly similar to a shape of the light modulation region.

17. An illuminator comprising:
a light source apparatus that outputs, in a first direction, light containing first polarized light and second polarized light polarized in directions different from each other;
a polarized light combiner that combines the first polarized light and the second polarized light outputted from the light source apparatus with each other and causes the combined light to exit in the first direction; and
a rod integrator that the combined light having exited out of the polarized light combiner enters, wherein the light source apparatus includes a first light emitter group having a configuration in which a plurality of semiconductor lasers including a first semiconductor laser that emits the first polarized light are arranged in a second direction that intersects the first direction and a second light emitter group having a configuration in which a plurality of semiconductor lasers including a second semiconductor laser that emits the second polarized light are arranged in the second direction, the first light emitter group and the second light emitter group are arranged in a third direction that interests the first and second directions, a light emission region of the first polarized light emitted from the first semiconductor laser has a first oblong plan shape having a first lengthwise direction, a light emission region of the second polarized light emitted from the second semiconductor laser has a second oblong plan shape having a second lengthwise direction, and the first lengthwise direction of the first oblong shape and the second lengthwise direction of the second oblong shape are along the third direction.

* * * * *